US009879722B2

(12) United States Patent
Jarrett et al.

(10) Patent No.: US 9,879,722 B2
(45) Date of Patent: Jan. 30, 2018

(54) LOW SHEAR MODULUS TRANSITION SHIM FOR ELASTOMERIC BEARING BONDING IN TORSIONAL APPLICATIONS (71) Applicant: Bell Helicopter Textron Inc., Fort Worth, TX (US)

(72) Inventors: Chad Lewis Jarrett, Arlington, TX (US); Frank Bradley Stamps, Colleyville, TX (US); Daniel P. Sottiaux, Flower Mound, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 1109 days.

(21) Appl. No.: 13/793,683

(22) Filed: Mar. 11, 2013

(65) Prior Publication Data
US 2014/0255191 A1 Sep. 11, 2014

(51) Int. Cl.
*F16C 33/04* (2006.01)
*B64C 27/35* (2006.01)
(Continued)

(52) U.S. Cl.
CPC ............. *F16C 33/04* (2013.01); *B64C 27/33* (2013.01); *B64C 27/35* (2013.01); *F16C 27/02* (2013.01); *F16F 1/3842* (2013.01)

(58) Field of Classification Search
CPC ........ F16C 25/02; F16C 43/02; F16C 33/122; F16C 33/22; F16C 33/06; F16C 33/23
(Continued)

(56) References Cited

U.S. PATENT DOCUMENTS 4,131,391 A * 12/1978 Robinson ................ B64C 27/43
416/140
4,135,856 A * 1/1979 McGuire ................ B64C 27/35
416/134 A
(Continued)

FOREIGN PATENT DOCUMENTS

DE 2042247 A1 * 3/1972 ............ F16C 27/063
DE 4110814 10/1991
(Continued)

OTHER PUBLICATIONS

Invitation Pursuant to Rule 63(1) EPC issued in European Application No. 14152689.7 dated Jun. 5, 2014; 4 pages.
(Continued)

*Primary Examiner* — Mark Laurenzi
*Assistant Examiner* — Mickey France (57) ABSTRACT A bearing assembly comprises a bearing, a shim disposed within the bearing, and a component disposed within the shim. The shim comprises a first material, the component comprises a second material, and the first material has an elastic modulus value that is lower than an elastic modulus value of the second material. An apparatus comprises an elastomeric bearing, a fiberglass shim, and a steel spindle that is connected to the elastomeric bearing through the shim. A method for reducing strain in an adhesive layer that connects a bearing to a component comprises selecting a shim material having an elastic modulus value that is less than an elastic modulus value of the component and providing instructions to connect the component to the shim by placing the adhesive layer between an outer surface of the component and an inner surface of the shim.

18 Claims, 7 Drawing Sheets (51) Int. Cl.
   *F16C 27/02*     (2006.01)
   *B64C 27/33*     (2006.01)
   *F16F 1/38*      (2006.01)

(58) Field of Classification Search
   USPC ..... 384/125, 276, 297, 626, 909, 912, 907.1
   See application file for complete search history.

(56) References Cited

U.S. PATENT DOCUMENTS

| | | | | |
|---|---|---|---|---|
| 4,373,862 A * | 2/1983 | Ferris | ............... | B64C 27/006 |
| | | | | 116/264 |
| 4,886,419 A | 12/1989 | McCafferty | | |
| 5,141,339 A * | 8/1992 | Evans | ............... | F16C 17/04 |
| | | | | 384/130 |
| 5,236,784 A * | 8/1993 | Kobayashi | ............... | F16C 33/16 |
| | | | | 384/907 |
| 8,360,721 B2 * | 1/2013 | Podgurski | ............... | B64C 27/35 |
| | | | | 416/1 |
| 2002/0035944 A1 * | 3/2002 | Kienzler | ............... | F16C 33/201 |
| | | | | 102/223 |
| 2002/0051874 A1 * | 5/2002 | Ishibashi | ............... | A44B 19/26 |
| | | | | 428/297.4 |
| 2002/0121824 A1 * | 9/2002 | Obara | ............... | F16C 19/18 |
| | | | | 310/90 |
| 2002/0131657 A1 * | 9/2002 | Inoue | ............... | F16C 33/1065 |
| | | | | 384/276 |
| 2003/0022797 A1 * | 1/2003 | Oohira | ............... | C10M 103/06 |
| | | | | 508/107 |
| 2004/0195662 A1 * | 10/2004 | Venegas | ............... | H01L 23/047 |
| | | | | 257/676 |
| 2005/0208313 A1 * | 9/2005 | Bickle | ............... | B32B 27/18 |
| | | | | 428/457 |
| 2006/0102455 A1 * | 5/2006 | Chiang | ............... | F03G 7/005 |
| | | | | 200/181 |
| 2009/0072639 A1 * | 3/2009 | Seneff | ............... | H02K 1/2793 |
| | | | | 310/43 |
| 2011/0001010 A1 * | 1/2011 | Tacke | ............... | B64C 1/061 |
| | | | | 244/131 |
| 2011/0151232 A1 * | 6/2011 | Meegan | ............... | B29C 70/025 |
| | | | | 428/221 |
| 2011/0206303 A1 | 8/2011 | James | | |
| 2012/0124833 A1 * | 5/2012 | Arendt | ............... | F03D 1/001 |
| | | | | 29/889.7 |
| 2012/0141052 A1 * | 6/2012 | Drew | ............... | F16C 23/045 |
| | | | | 384/13 |
| 2012/0294557 A1 * | 11/2012 | Soelch | ............... | C09D 147/00 |
| | | | | 384/282 |

FOREIGN PATENT DOCUMENTS

| | | |
|---|---|---|
| GB | 2299649 | 10/1996 |
| WO | 3087618 | 10/2003 |

OTHER PUBLICATIONS

European Search Report issued in European Application No. 14152689.7 dated Oct. 8, 2014, 4 pages.
Office Action issued in Canadian Application No. 2,845,844 dated Feb. 29, 2016; 4 pages.
Communication Pursuant to Article 94(3) EPC issued in European Application No. 14152689.7 dated Oct. 31, 2014; 8 pages.
Communication under Rule 71(3) EPC issued in European Application No. 14152689.7 dated Mar. 27, 2015; 25 pages.
Office Action issued in Canadian Application No. 2,845,844 dated Apr. 21, 2015; 4 pages.

* cited by examiner

LOW SHEAR MODULUS TRANSITION SHIM FOR ELASTOMERIC BEARING BONDING IN TORSIONAL APPLICATIONS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Bearings are commonly used to allow one component to move relative to another component. For instance, one example of a bearing includes a shear bearing in a helicopter rotor assembly. The shear bearing of a helicopter rotor assembly enables a rotor blade to be rotated relative to a rotor hub to control the pitch of the rotor blade. In one particular application, a helicopter rotor assembly includes a main rotor grip that has an inboard end that is attached to a pitch horn, an outboard end that is attached to a rotor blade, and a spindle between the inboard end and the outboard end. The spindle passes through the shear bearing and translates motion from the pitch horn to the rotor blade. In such a case, the rotating spindle generates torsional strain that is passed through to the shear bearing.

SUMMARY

In some embodiments of the disclosure, a bearing assembly is provided that comprises a bearing, a shim disposed within the bearing, and a component disposed within the shim. The shim comprises a first material, the component comprises a second material, and the first material has an elastic modulus value that is lower than an elastic modulus value of the second material.

In other embodiments of the disclosure, an apparatus is provided that comprises an elastomeric bearing, a fiberglass shim, and a steel spindle that is connected to the elastomeric bearing through the shim.

In yet other embodiments of the disclosure, a method is provided for reducing strain in an adhesive layer that connects a component to a bearing. The method comprises selecting a shim material having an elastic modulus value that is less than an elastic modulus value of the component and providing instructions to connect the component to the shim by placing the adhesive layer between an outer surface of the component and an inner surface of the shim.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Certain embodiments of the disclosure include a transition shim that is used to bond a component to a bearing. The transition shim may have an elastic modulus value that is lower than an elastic modulus value of the component being bonded to the bearing. For instance, in one particular embodiment, for illustration purposes only and not by limitation, a steel spindle is bonded to an elastomeric bearing using a transition shim that is made of a material that has a lower elastic modulus value than the steel in the spindle. The transition shim is fitted within the elastomeric bearing, and the steel spindle is bonded to the transition shim using an adhesive. In such a case, as torsional strain is applied to the steel spindle, the transition shim absorbs a portion of the torsional strain. This reduces the amount of torsional strain in the adhesive layer. Accordingly, since the amount of torsional strain in the adhesive layer is reduced, the adhesive layer may be less likely to fail during operation and may require less maintenance. Additionally, the use of a transition shim may be advantageous in that it can replace custom molded bearings and components (e.g., spindles), which may have long lead times and be difficult to assemble and replace. These and other features and advantages of embodiments of the disclosure are described in greater detail below and shown in the accompanying figures.

Figure 1:
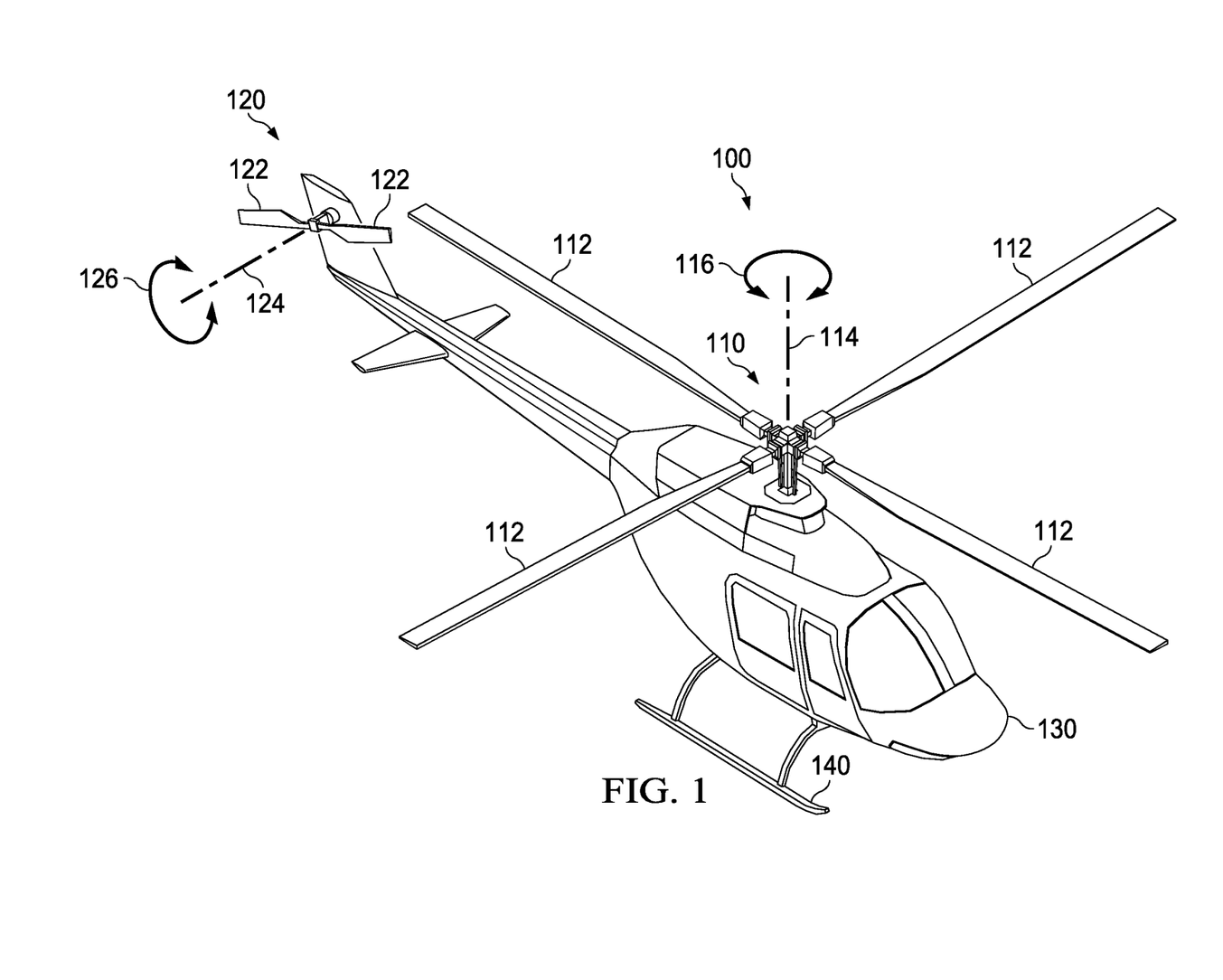
FIG. 1 is a perspective view of a helicopter according to an embodiment of the disclosure.

FIG. 1 is a perspective view of a helicopter 100. Certain embodiments of the disclosure may be used with a helicopter such as helicopter 100. However, it should be understood that the helicopter example is given merely for illustration purposes only. Embodiments of the present disclosure are not limited to any particular setting or application, and embodiments can be used with a bearing in any setting or application such as other aircraft, vehicles, or equipment.

Helicopter 100 includes a main rotor assembly 110, a tail rotor assembly 120, a fuselage 130, and landing gear 140. Main rotor assembly 110 includes two or more blades 112 that are rotated about an axis of rotation 114 in either a clockwise direction or a counterclockwise direction as indicated by arrow 116. Main rotor assembly 110 generates a lift force that supports the weight of helicopter 100 and a thrust force that counteracts aerodynamic drag. Main rotor assembly 110 can also be used to induce pitch and roll of helicopter 100.

Tail rotor assembly 120 includes two or more blades 122 that are rotated about an axis of rotation 124 in either a clockwise direction or a counterclockwise direction as indicated by arrow 126. Tail rotor assembly 120 counters the torque effect created by main rotor assembly 110 and allows a pilot to control the yaw of helicopter 100.

Fuselage 130 is the main body section of helicopter 100. Fuselage 130 optionally holds the crew, passengers, and/or cargo and houses the engine, transmission, gear boxes, drive shafts, control systems, etc. that are needed to establish an operable helicopter. Landing gear 140 is attached to fuselage 130 and supports helicopter 100 on the ground and allows it to take off and land.

Figure 2:
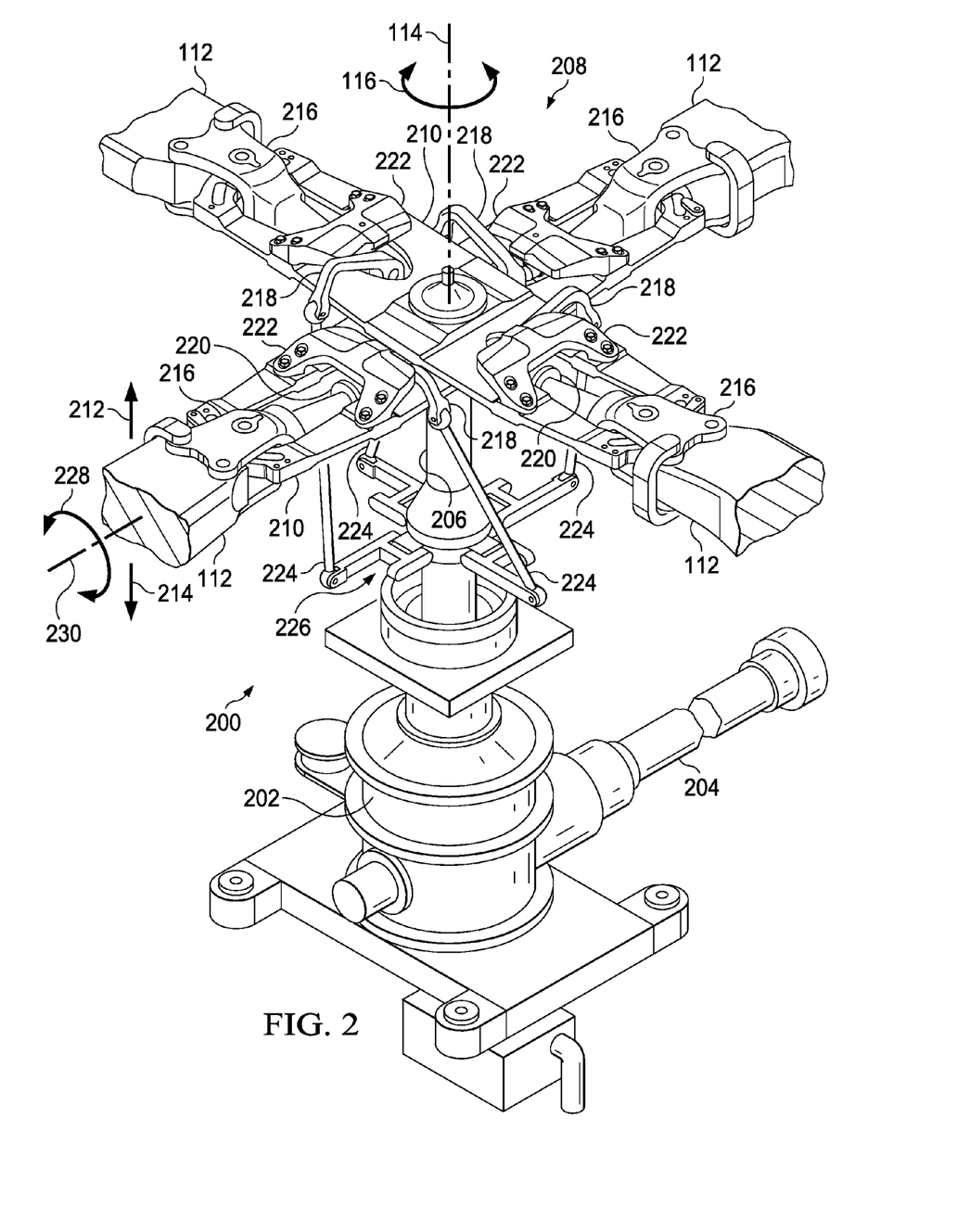
FIG. 2 is a perspective view of a power train according to an embodiment of the disclosure.

FIG. 2 is a perspective view of a power train 200. Power train 200 can be used in a helicopter such as helicopter 100 shown in FIG. 1. However, power train 200 is not limited to any particular setting. Additionally, it should be noted that the particular example shown in FIG. 2 shows a soft-in plane rotor system having four blades 112. Embodiments of the disclosure are not limited to any particular configuration of rotor system and blades, and embodiments may include any type of rotor system (e.g., fully articulated, rigid, semirigid, etc.) and may include any number of blades (e.g., 2, 3, 4, 5, 6, etc.).

Power train 200 includes a transmission 202 that receives power from an engine (not shown) through a driveshaft 204. Transmission 202 drives accessories and controls the rotation 116 of mast 206 about an axis of rotation 114. Mast 206 transfers its rotational movement to blades 112 through a hub 208 that connects mast 206 to blades 112.

Hub 208 optionally includes one or more flexible yokes 210 that enable blades 112 to flap up in the direction indicated by arrow 212 and flap down in the direction indicated by arrow 214. Hub 208 may also include a main rotor grip 216 for each blade 112 that is attached to hub 208. As is described in greater detail below, main rotor grip 216 includes an outboard end that attaches to a blade 112, an inboard end that attaches to a pitch horn 218, and a spindle between the outboard end and the inboard end. The spindle is supported by a shear bearing 220 that holds the spindle in place and allows it to rotate. Shear bearing 220 is in turn held in place by a bridge plate 222 that attaches shear bearing 220 to yoke 210.

Each pitch horn 218 is connected to a pitch linkage 224. Each pitch linkage 224 is driven up and down (e.g., in the directions shown by arrows 212 and 214) by a swashplate assembly 226. Accordingly, as swashplate assembly 226 moves, it drives pitch linkage 224, which drives pitch horn 218 which rotates main rotor grip 216 about shear bearing 220. This allows the pitch of each of the blades 112 to be controlled. For instance, each blade 112 is able to rotate clockwise or counterclockwise as indicated by arrow 228 about an axis of rotation 230 that runs along the length of each blade 112.

Figure 3:
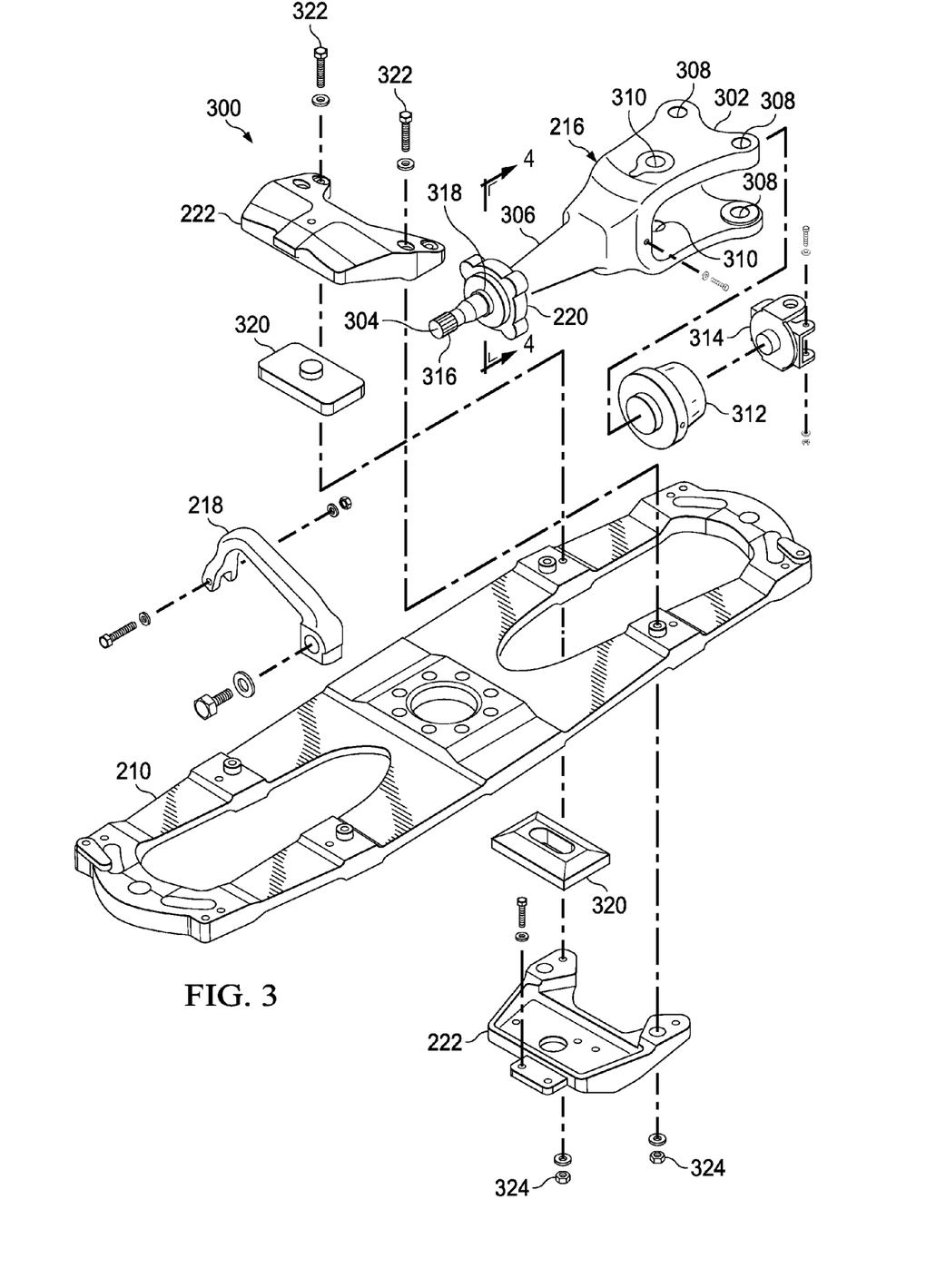
FIG. 3 is an exploded view of a yoke and main rotor grip assembly according to an embodiment of the disclosure.

FIG. 3 is an exploded view of a yoke and a main rotor grip assembly 300. Main rotor grip 216 includes an outboard end 302, an inboard end 304, and a spindle 306. Outboard end 302 optionally includes one or more apertures 308 or other attachment mechanisms that are configured to attach a rotor blade (e.g., blade 112 in FIGS. 1 and 2) to main rotor grip 216. Outboard end 302 may also include one or more apertures 310 or other attachment mechanisms that are configured to attach a centrifugal force (CF) bearing 312 to main rotor grip 216 using a bracket 314. The main rotor grip inboard end 304 optionally includes an outer surface 316 that is configured to attach to and transfer motion from pitch horn 218 to spindle 306. Outer surface 316 may be a smooth surface or may be a textured surface (e.g., have gear teeth, splines, etc.).

Main rotor grip spindle 306 is fit within shear bearing 220 that supports pitch rotation of main rotor grip 216. In an embodiment of the disclosure, a transition shim 318 is placed within shear bearing 220 and may reduce an amount of torsional strain in an adhesive layer used to connect spindle 306 to shear bearing 220. Shear bearing 220 is optionally placed between two dampers 320 and is attached to yoke 210 using bridge plates 222. As shown in FIG. 3, bridge plates 222 may be attached to yoke 210 using an attachment mechanism such as, but not limited to, bolts 322 and nuts 324.

Figure 4:
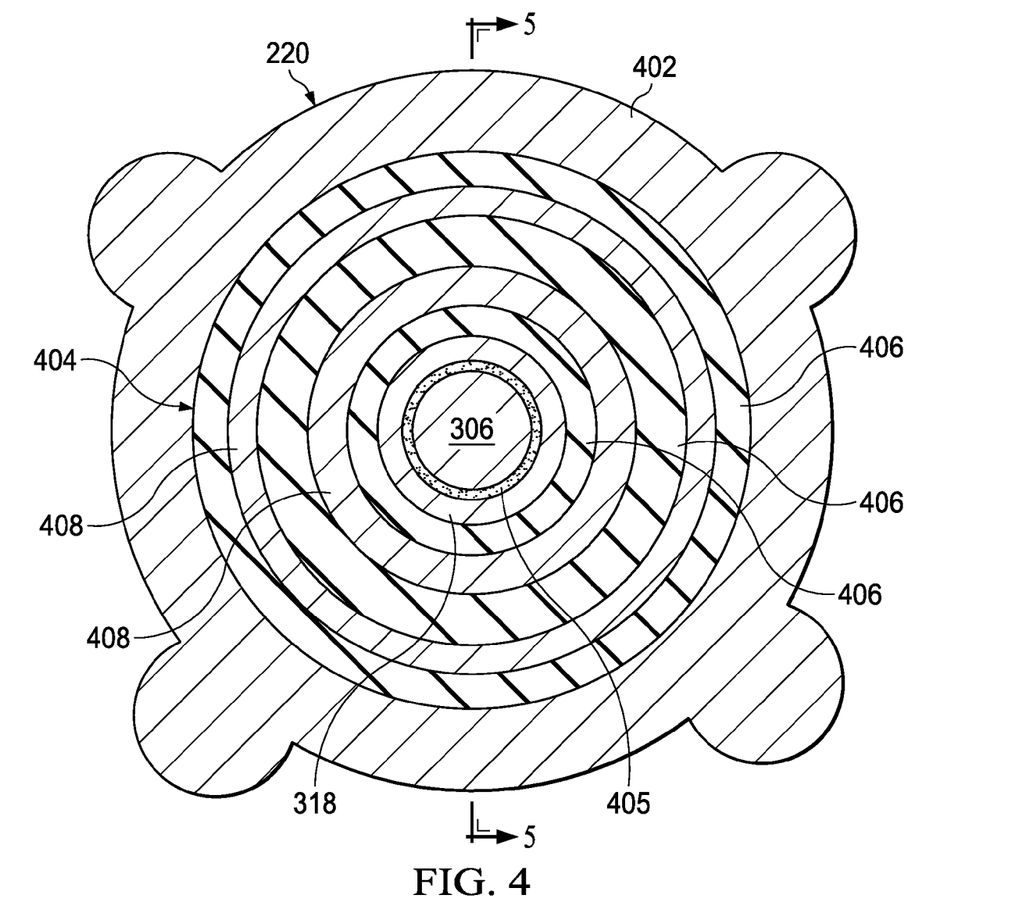
FIG. 4 is a cross-sectional view of a spindle connected to a bearing having a shim according to an embodiment of the disclosure.

FIG. 4 is a cross-sectional view of main rotor grip spindle 306, transition shim 318, and shear bearing 220 from the perspective of line 4-4 in FIG. 3. Shear bearing 220 optionally includes an outer housing 402 and a bearing portion 404. In one embodiment, shear bearing 220 is an elastomeric bearing, and bearing portion 404 has multiple layers that are laminated together. In one particular example, as is illustrated in FIG. 4, bearing portion 404 includes alternating elastomeric layers 406 and rigid layers 408. Elastomeric layers 406 may be made of an elastic material such as rubber, and rigid layers 408 may be made of a rigid material such as steel. However, embodiments are not limited to any particular materials, and elastomeric layers 406 and rigid layers 408 may be made of any elastic and rigid materials, respectively. Additionally, embodiments are not limited to any particular number of layers and may include any number of elastomeric layers 406 and rigid layers 408.

As is shown in FIG. 4, spindle 306 is connected to bearing portion 404 through an adhesive layer 405 and a transition shim 318. Spindle 306 may have a cylindrical shape, and adhesive layer 405, transition shim 318, and bearing portion 404 may have annular cylinder shapes. In such a case, spindle 306 fits with adhesive layer 405, adhesive layer 405 fits within transition shim 318, and transition shim 318 fits within bearing portion 404 which is enclosed by the bearing outer housing 402. However, embodiments are not limited to any particular shapes and can include any shapes. For instance, each of the components could have a tapered shape, a cone shape, a spherical shape, etc.

In one embodiment, transition shim 318 is made of a material that has a lower elastic modulus value than spindle 306. For example, spindle 306 may be made of steel, and transition shim 318 may be made of a material having a lower elastic modulus value than the spindle 306 material such as, but not limited to, fiberglass, carbon fiber composites, brass, aluminum, gold, silver, copper, a polymer, or any other material or combination of materials that has a lower elastic modulus value than the spindle 306 material. Additionally, it should be noted that spindle 306 may comprise a high elastic modulus steel and that transition shim 318 may comprise a low elastic modulus steel.

In at least certain circumstances, the use of shim 318 in connecting spindle 306 to bearing 220 may reduce the torsional strain in adhesive layer 405. For instance, as torsional strain is applied to spindle 306, shim 318 absorbs a portion of the torsional strain. This reduces the amount of torsional strain in adhesive layer 405. Accordingly, since the amount of torsional strain in adhesive layer 405 is reduced, adhesive layer 405 may be less likely to fail during operation and may require less maintenance. Specifically, this arrangement may lead to a higher mean time between failure than without a transition. In one specific example, for illustration purposes only and not by limitation, the use of shim 318 can enable an adhesive layer (e.g., adhesive layer 405) to be able to accommodate 1°-2° of torsion over an approximately 6 inch segment of a spindle (e.g., a spindle 306).

Figure 5:
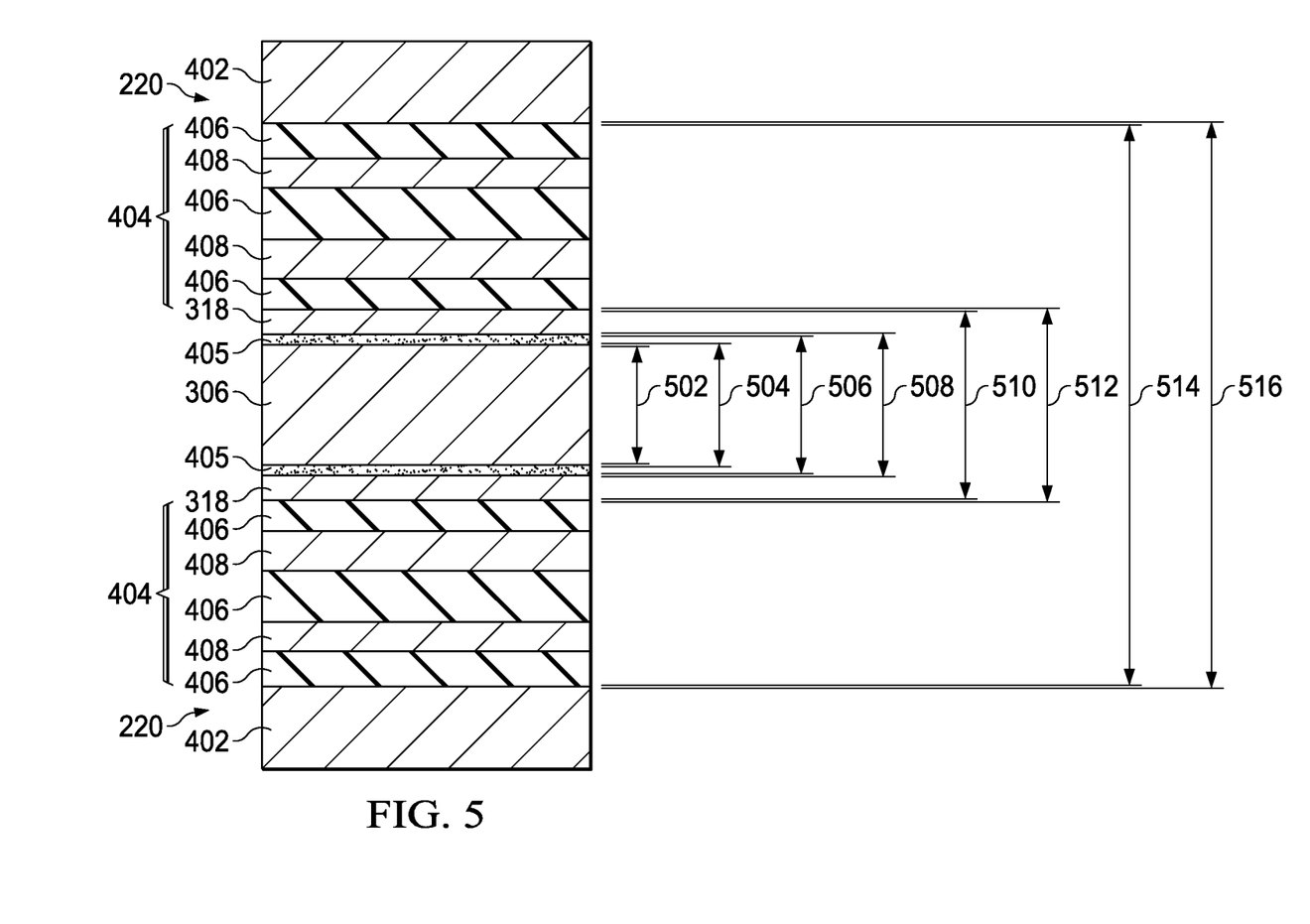
FIG. 5 is a cross-sectional view of a main rotor grip spindle, an adhesive layer, a transition shim, and a shear bearing according to an embodiment of the disclosure.

FIG. 5 is a cross-sectional view of main rotor grip spindle 306, adhesive layer 405, transition shim 318, and shear bearing 220 from the perspective of line 5-5 in FIG. 4. FIG. 5 illustrates the embodiment in which spindle 306 has a cylindrical shape, and adhesive layer 405, transition shim 318, and bearing portion 404 have annular cylinder shapes. In such a case, spindle 306 has an outer diameter 502 that is less than an inner diameter 504 of adhesive layer 405. Adhesive layer 405 has an outer diameter 506 that is less than an inner diameter 508 of shim 318. Shim 318 has an outer diameter 510 that is less than an inner diameter 512 of bearing portion 404, and bearing portion 404 has an outer diameter 514 that is less than an inner diameter 516 of a cylindrical aperture of the outer bearing housing 402. Again, it is worth noting that embodiments are not limited to any particular shapes and can include shapes other than the particular examples illustrated in the figures. For instance, the components in FIG. 5 could have a tapered shape or any other shape.

Figure 6A:
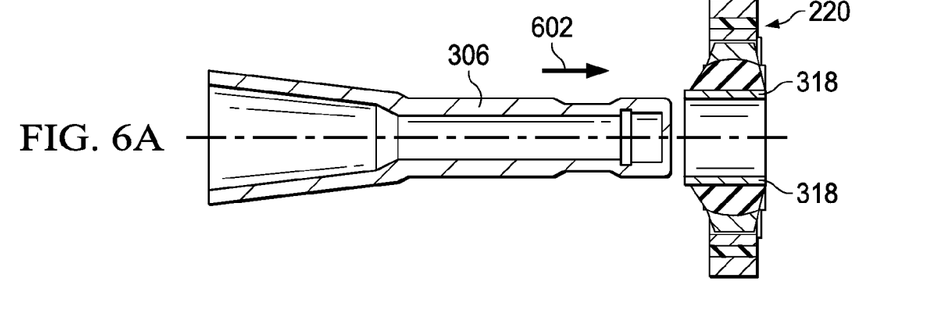
FIGS. 6A-6D are top down cross-sectional views illustrating the assembly of a spindle to a bearing using a shim according to an embodiment of the disclosure.
Figure 6B:
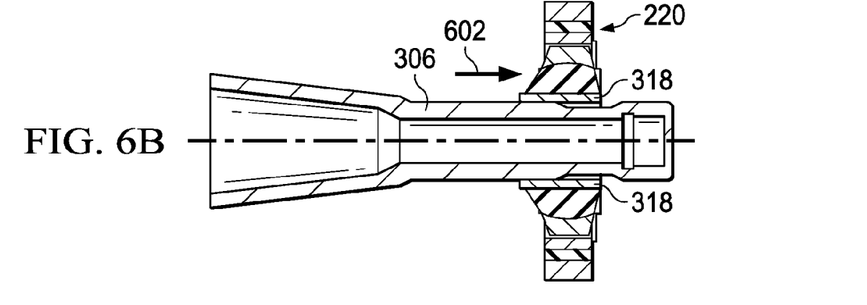
Figure 6C:
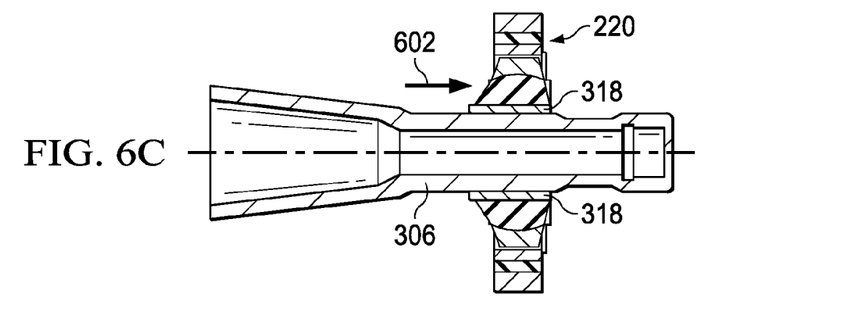
Figure 6D:
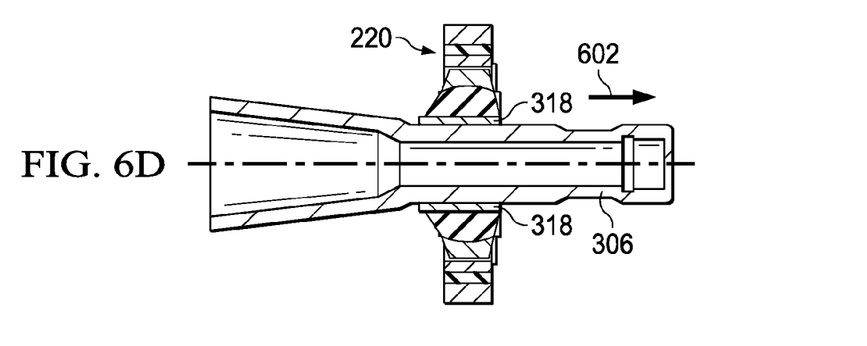

FIGS. 6A-6D are top down cross-sectional views illustrating the assembly of spindle 306 to bearing 220 using shim 318. As shown in FIG. 6A, shim 318 is first placed within bearing 220. Then, as shown in FIGS. 6A-6D, spindle 306 is inserted within shim 318 as indicated by arrow 602 until spindle 306 reaches its final location in FIG. 6D. In the particular example shown in FIGS. 6A-6D, spindle 306 has a graduated outer diameter that increases along the length of spindle 306. Adhesive is applied at the smaller diameter portion of spindle 306, and the thickness of the adhesive layer is reduced as shim 318 is moved through bearing 220. This method may help improve the consistency of the adhesive layer by expelling trapped gas pockets as spindle 306 is moved to its final location. In another embodiment, a vacuum is used to further draw out gas from the adhesive layer. Furthermore, strands (e.g., fiberglass or carbon fiber strands) or a string-type material can be used during the assembly process to ensure a uniform adhesive layer. However, embodiments are not limited to any particular method of attaching a spindle to a bearing using a shim.

Additionally, it should be noted that at least certain embodiments of the disclosure do not require that a bearing and a component being attached to the bearing be custom molded to each other. Instead, the bearing and the component can be separately manufactured. This can reduce lead times for parts and reduce costs as compared to other bearings and components that need to be custom molded.

Figure 7:
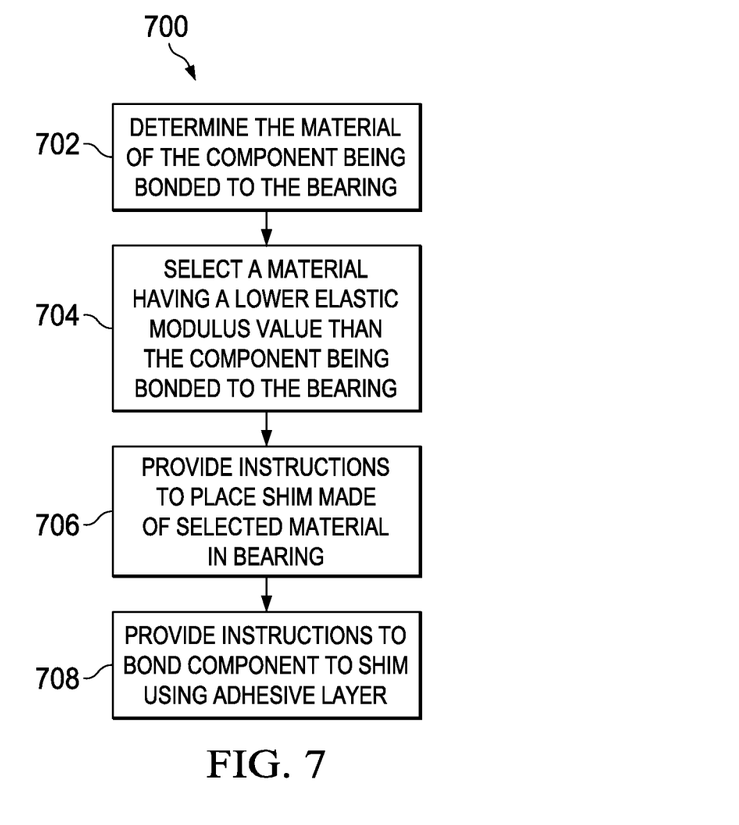
FIG. 7 is a flowchart illustrating a method of bonding a component to a bearing using a shim according to an embodiment of the disclosure.

FIG. 7 is a flowchart illustrating a method 700 of bonding a component to a bearing using a shim. As previously mentioned, embodiments of the disclosure are not limited to the particular helicopter shear bearing examples described above and shown in the figures. Instead, embodiments of the disclosure can be used in any setting or application in which a component is bonded to a bearing. For instance, embodiments can be used with a tail rotor flapping bearing, a tail rotor shear restraint, or any other apparatus comprising a bearing.

At block 702, the material of the component being bonded to the bearing is determined (e.g., the spindle material is determined). At block 704, a material is selected that has a lower elastic modulus than the material of the component that is being bonded to the bearing (e.g., the shim material is selected). At block 706, instructions are provided to place a shim that is made from the material selected at block 704 within the bearing, and at block 708, instructions are provided to bond the component to the shim using an adhesive. Accordingly, instructions are provided to bond the component to the bearing through the adhesive layer and the shim.

As has been described above and shown in the figures, certain embodiments of the disclosure include a shim that is used to bond a component to a bearing. The shim may have an elastic modulus value that is lower than an elastic modulus value of the component being bonded to the bearing. In such a case, as torsional strain is applied to the component, the shim absorbs a portion of the torsional strain. This reduces an amount of torsional strain experienced by an adhesive layer. Accordingly, since the amount of torsional strain in the adhesive layer is reduced, the adhesive layer may be less likely to fail during operation and may require less maintenance. Additionally, the use of a shim may be advantageous in that it can replace custom molded bearings and components, which may have long lead times and be difficult to assemble and replace.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:
1. A bearing assembly comprising:
  a bearing comprising alternating rigid and elastomeric layers;
  a shim fitted within the bearing, the shim comprising fiberglass;
  a metal rotor blade spindle disposed within the shim; and an adhesive layer that adheres the shim to the metal rotor blade spindle, wherein the shim comprises a first material and the metal rotor blade spindle a second material, wherein the first material has an elastic modulus value that is lower than an elastic modulus value of the second material, and the shim is configured to absorb at least a portion of a torsional strain between the metal rotor blade spindle and the bearing that reduces torsional strain on the adhesive layer.

2. The bearing assembly of claim 1, wherein the metal comprises steel.

3. The bearing assembly of claim 1, wherein the bearing comprises an elastomeric bearing.

4. The bearing assembly of claim 1, further comprising an adhesive layer disposed between the shim and the bearing.

5. The bearing assembly of claim 1, wherein the bearing comprises a helicopter rotor shear bearing.

6. The bearing assembly of claim 1, wherein the metal rotor blade spindle comprises a spindle of a rotor grip.

7. An apparatus comprising:

an elastomeric bearing comprising alternating rigid and elastomeric layers;

a fiberglass shim disposed within the elastomeric bearing, wherein the fiberglass shim comprises a first material and a steel rotor blade spindle comprises a second material and is fitted with the fiberglass shim a second material, wherein the first material has an elastic modulus value that is lower than an elastic modulus value of the second material, and the fiberglass shim is configured to absorb at least a portion of a torsional strain between the steel rotor blade spindle and the elastomeric bearing that reduces torsional strain on an adhesive layer between the fiberglass shim and the steel rotor blade spindle;

wherein the steel rotor blade spindle is connected to the elastomeric bearing through the fiberglass shim; and the adhesive layer adheres the fiberglass shim to the steel rotor blade spindle.

8. The apparatus of claim 7, further comprising a pitch horn that is attached to one end of the steel rotor blade spindle and that is configured to rotate the steel rotor blade spindle within the elastomeric bearing.

9. The apparatus of claim 7, wherein the elastomeric bearing comprises alternating elastic and rigid layers.

10. The apparatus of claim 7, wherein the elastomeric bearing comprises a rotor shear bearing.

11. The apparatus of claim 7, wherein the steel spindle is a steel rotor blade spindle of a rotor grip that is configured to rotate a rotor blade, wherein the rotor grip and the rotor blade are components of a rotor assembly, wherein the apparatus further comprises an engine, a drive shaft, a transmission, a mast, and a fuselage, wherein power from the engine is transferred to the rotor assembly through the drive shaft, the transmission, and the mast, and wherein the fuselage houses and supports at least a portion of the engine, the drive shaft, the transmission, and the mast.

12. A method for reducing strain in an adhesive layer that connects a bearing to a metal rotor blade spindle, the method comprising:

selecting a shim material, wherein the shim material is fiberglass, having an elastic modulus value that is less than an elastic modulus value of the metal rotor blade spindle, wherein the shim comprises a first material and the metal rotor blade spindle is fitted with the shim a second material, wherein the first material has an elastic modulus value that is lower than an elastic modulus value of the second material, and the shim is configured to absorb at least a portion of a torsional strain between the metal rotor blade spindle and the bearing that reduces torsional strain on the adhesive layer; and adhering the shim to the metal rotor blade spindle with the adhesive layer between an outer surface of the metal rotor blade spindle and an inner surface of the shim.

13. The method of claim 12, wherein connecting the metal rotor blade spindle to the shim comprises bonding the metal rotor blade spindle to the shim using fiberglass strands or carbon fibers.

14. The method of claim 12, wherein connecting the metal rotor blade spindle to the shim comprises removing gas bubbles from the adhesive layer using a vacuum.

15. The method of claim 12, comprising disposing the shim within the bearing before the metal rotor blade spindle is connected to the shim.

16. The method of claim 12, further comprising selecting a shape of the shim.

17. The method of claim 16, wherein selecting the shape of the shim comprises selecting a shim having an annular cylinder shape.

18. The method of claim 16, wherein selecting the shape of the shim comprises selecting a shim having an annular tapered shape.

* * * * *